United States Patent [19]

Wörner et al.

[11] Patent Number: 4,759,259
[45] Date of Patent: Jul. 26, 1988

[54] SERVO-CONTROL FOR POWER STEERING ARRANGEMENT

[75] Inventors: Günter Wörner, Kernen; Arno Röhringer, Ditzingen; Reinhold Abt, Neuhausen, all of Fed. Rep. of Germany

[73] Assignee: Daimler-Benz Aktiengesellschaft, Stuttgart, Fed. Rep. of Germany

[21] Appl. No.: 945,498

[22] Filed: Dec. 23, 1986

[30] Foreign Application Priority Data

Dec. 23, 1985 [DE] Fed. Rep. of Germany ....... 3545858

[51] Int. Cl.⁴ ............................................. F15B 9/10
[52] U.S. Cl. ........................................ 91/373; 91/374; 91/382; 74/388 PS
[58] Field of Search ................. 91/370, 371, 372, 373, 91/374, 379, 382; 74/499, 388 PS

[56] References Cited

U.S. PATENT DOCUMENTS

| | | | |
|---|---|---|---|
| 2,685,342 | 8/1954 | Lauck | 91/374 X |
| 2,717,579 | 9/1955 | Leduc | 91/370 |
| 2,954,837 | 10/1960 | Ziskal | 91/373 X |
| 3,044,569 | 7/1962 | Farmery et al. | 91/372 X |
| 3,855,904 | 12/1974 | Jablonsky | 91/372 X |
| 3,978,770 | 9/1976 | Strauff | 91/372 |
| 4,438,679 | 3/1984 | Lang et al. | 91/370 |

FOREIGN PATENT DOCUMENTS

| | | |
|---|---|---|
| 0112249 | 11/1986 | European Pat. Off. . |
| 2214001 | 11/1972 | Fed. Rep. of Germany . |
| 2501751 | 1/1976 | Fed. Rep. of Germany . |
| 3248251 | 7/1984 | Fed. Rep. of Germany . |
| 1122015 | 7/1968 | United Kingdom . |

Primary Examiner—Robert E. Garrett
Assistant Examiner—Mark A. Williamson
Attorney, Agent, or Firm—Barnes & Thornburg

[57] ABSTRACT

A steering wheel end shaft part and a gear end shaft part are connected together elastically by means of a mechanism located between the shaft parts, the relative rotation between the shaft parts being converted into a large-stroke pivoting movement of a setting lever which actuates a control valve unit of the power steering system.

32 Claims, 3 Drawing Sheets

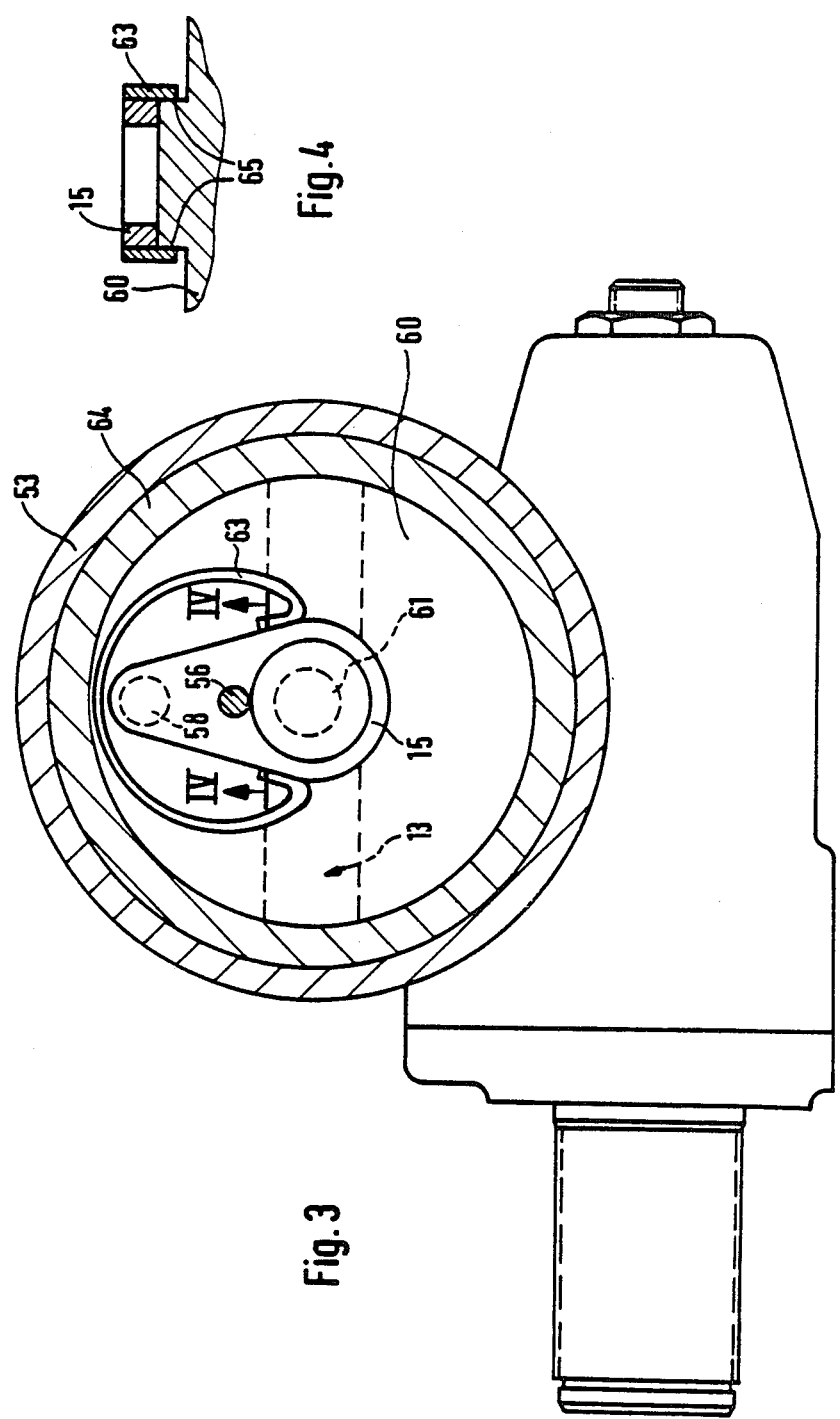

4,759,259

SERVO-CONTROL FOR POWER STEERING ARRANGEMENT

BACKGROUND AND SUMMARY OF THE INVENTION

The invention relates to a servo-control, in particular power steering for motor vehicles, having an input end or steering wheel end shaft part and a mechanism connecting this shaft part to a control end or steering gear end shaft part. The mechanism operates with a relatively large transmission ratio and is used to adjust a control slide of a servo-valve unit. In the case of rotational movements of the shaft part, the control slide is deflected from a central position by the mechanism. The direction and the amount of the deflection of the control slide is a function of the magnitude and direction of the rotational movement of the shaft parts. The deflection of the control slide connects a servo-motor, which is controlled by the servo-valve unit and drive-connected to the control or steering gear, to a pressure source so as to produce a forward or rearward motion with a setting force which depends on the magnitude of the displacement of the control slide.

In a power steering of this type, known from German Offenlegungsschrift No. 2,501,751, the mechanism is essentially formed by a steering nut which is arranged so that it can perform a screwing movement on a spindle arranged as part of the inlet end shaft part. The steering nut is arranged so as to be rotatable to a limited extent within an axially movable piston which follows the axial movement of the steering nut on the spindle and, by means of teeth provided on it, meshes with a toothed segment which in turn drives a linkage for controlling the wheels which steer the vehicle. A lever type protrusion radially penetrating the piston is firmly fixed to the steering nut and the free end of this protrusion actuates the control slide, arranged transverse to the axis of the steering nut, of a stationary servo-valve unit.

In this known servo-control, large setting motions of the control slide can be achieved. This offers the possibility of controlling servo-valve units with large opening cross-sections. It follows that a pressure source with a relatively low pressure is sufficient. The steering nut rotational motions actuating the control slide take place, however, against a relatively large frictional resistance which may reduce the steering sensitivity.

A power steering system is known from German Auslegeschrift No. 2,214,001 in which the mechanism is located between an input end or steering wheel end shaft part and a further shaft part on the same axis, which further shaft part is elastically connected to the input end shaft part. Gear wheels arranged on each of the shaft parts and meshing in turn with gear wheels on a common axis near the shaft parts, are used as the mechanism. Between the latter gear wheels, there is a lever mechanism which converts relative rotations between the latter gear wheels into a translational motion in the axial direction of these gear wheels in order to adjust the control slide located on the same axis as the last mentioned gear wheels. Although this arrangement can, in appropriate case, achieve the result that the setting distance of the control slide is large in comparison with the relative rotations between the shaft parts, the size of the arrangement is undesirably large.

Power steering systems are also known from DE-OS No. 32 48 251, for example, in which systems the control valve unit is directly located on one shaft part and the other shaft part is directly connected to the control slide or control slides of the valve unit. Although this permits a very compact installation, the setting distances of the control slides are small corresponding to the very small relative rotations between the shaft parts. This has the result that the control valve unit can only control openings with a relatively small cross-section because otherwise the setting distance of the control slide would not be sufficient to effect control in every condition between fully open and fully closed. Because of the small cross-sections, however, a pressure source with a relatively high pressure must be used in order to supply the necessary quantity of the fluid medium, generally a hydraulic medium, to the servo-motor, despite the throttling effect of the relatively narrow cross-sections of the control valve unit. This implies that the pressure source, for example a pump, has a relatively high power requirement which, in the case of a power steering system, has to be taken from the vehicle engine and is therefore not available for actually propelling the vehicle. For vehicle engine fuel consumption reasons, however, it is desirable that the auxiliaries should have the smallest possible power requirement.

It is an object of the invention then, to produce a servo-control or power steering system which features small space requirements, relatively low power demands on the pressure source and low friction within the mechanism.

The invention achieves this object for a servo-control or power steering system of the type mentioned in that the mechanism is located directly between the input end shaft part, or a part directly connected to it, and a further shaft part, or a part directly connected to it. The mechanism is elastically connected on the same axis as the input end shaft part. The servo-valve unit is located on a shaft part or a part connected to it. The mechanism, a setting lever directly actuating the control slide, is rotationally supported on a shaft part, or the part directly connected to it, by means of a support pin located parallel and eccentric to the shaft axis. The lever is hinge-connected or coupled to the other shaft part, or the part directly connected to it, on the support pin side of the shaft axis and at a radial distance from the support pin.

According to a preferred embodiment of the invention, therefore, the mechanism is effected by a single lever element located between the shaft parts or the parts directly connected to them. This readily permits a high transmission ratio because the setting lever is hinge-connected or rotatably coupled near its support pin on one shaft part, or the part connected to it, to the other shaft part, or the part connected to it. The invention is therefore based on the general idea of locating a compact and, from the design point of view, extremely simple mechanism with a large transmission ratio axially directly between the shaft parts so that the servo-valve unit can be arranged on a shaft part or the part connected to it in a known manner and the control slide or control slides can nevertheless execute a large setting movement compared with the relative rotational motion of the shaft parts. It follows that the control slides can control large opening cross-sections with relatively small throttling resistances so that the pressure source or pressure pump of the servo-control or power steering system only has to operate against a relatively small resistance and therefore has a greatly reduced power requirement.

According to one preferred embodiment of the invention, the setting lever is a double arm lever with a support pin parallel and eccentric to the shaft axis. The double arm lever is rotationally supported on one shaft part, or the part directly connected to it, and has one lever arm hinge-connected to the control slide and the other lever arm hinge-connected to the other shaft part or to the part directly connected to it. In this arrangement, the arm of the double lever actuating the control slide is preferably longer than the other lever arm. However, even with the same length of lever arms, a high transmission ratio is achieved if the support pin is located with a large eccentricity relative to the shaft axis.

According to another embodiment of the invention, the setting lever has a limited pivoting range. By this limiting arrangement, the relative rotation possible between the shaft parts is limited and, at the same time, positive mechanical coupling is provided between the shaft parts so that the servo-control or power steering remains functional even in the case of defects in the fluid system. The limiting of the pivoting range thus provides mechanical security which, if necessary, maintains a purely mechanical drive connection between the shaft parts therefore, between the handle or steering wheel and the control or steering gear.

In order to limit the pivoting range, the setting lever can, by means of a recess radially outward from its support pin, encompass with play a protrusion on one shaft part or on the part directly connected to it.

According to another embodiment of the invention, the setting lever is restrained in a central position by spring means. For this purpose, a spring connection, for example by means of a torsion rod, can in principle be located between the shaft parts.

In order that the arrangement of the setting lever should have sufficient space, however, the setting lever is preferably restrained in the central position by means of a C-type spring clip which encompasses the setting lever or one of its lever arms and the abutments of which are located on a shaft part, or the part directly connected to it, at a distance apart corresponding to the width of the setting lever or lever arm in the region of the ends of the spring clips. In the central position of the setting lever, therefore, the ends of the spring clip are in contact both with the flanks of the setting lever or lever arm and with the abutments whereas, when the setting lever is deflected, the C-type spring clip is increasingly spread out, one end of the clip being in contact with one of the abutments and the other end of the clip being in contact with the opposite flank of the setting lever or lever arm.

The control slide is preferably arranged as a piston-type part displaceable in a radial plane of the shaft. In view of the relatively large setting distances provided by the invention, the control slide is preferably arranged with its longitudinal axis intersecting the shaft axis at right angles.

Further objects, features, and advantages of the present invention will become more apparent from the following description when taken with the accompanying drawings(s) which show, for purposes of illustration only, an embodiment in accordance with the present invention.

BRIEF DESCRIPTION OF THE DRAWINGS

FIG. 3 shows a sectional diagram corresponding to the section plane III—III in FIG. 2; and FIG. 4 shows a sectional diagram corresponding to the section plane IV—IV in FIG. 3.

DETAILED DESCRIPTION OF THE DRAWINGS

Figure 1:
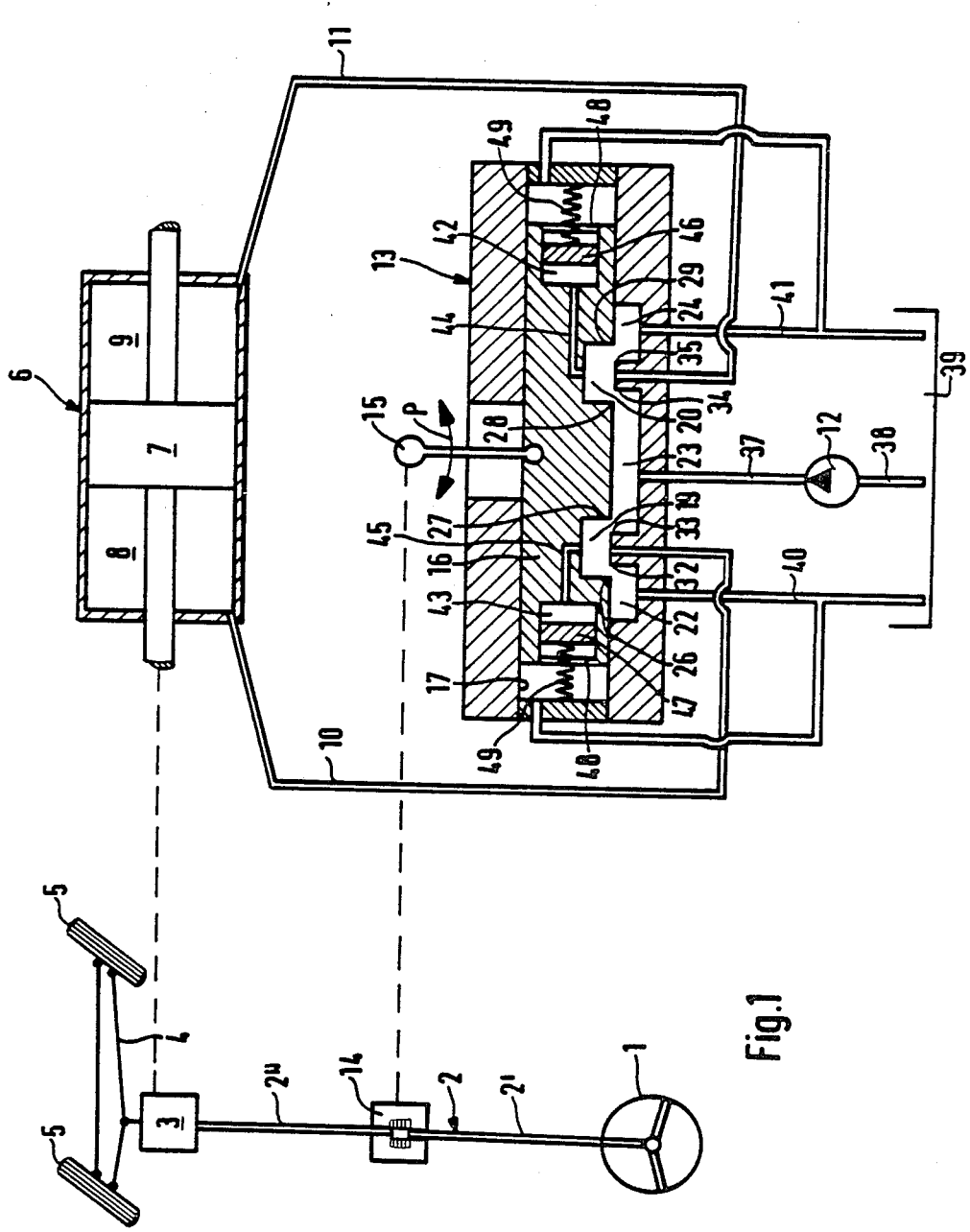
FIG. 1 shows a diagrammatic circuit diagram of the power steering system according to an embodiment of the invention.

The functional principle of the power steering according to an embodiment of the invention is first described using FIG. 1.

The power steering system has, located in front of the driver's seat in the motor vehicle, a conventional steering wheel 1 which, via steering shaft 2 rotationally firmly connected to it, actuates a steering gear 3. The steering gear 3 in turn deflects the steered wheels 5 of the vehicle to the right or to the left, corresponding to the direction of rotation of the steering wheel 1, by means of a steering linkage 4.

In order to reduce the force with which the steering wheel 1 has to be actuated, a servo-motor 6 is provided which in turn supports the work of the steering gear 3, i.e. it generates part of the setting forces required to control the steered wheels 5.

As shown in FIG. 1, the servo-motor 6 is designed as a piston/cylinder unit with a double-acting piston 7 which is displaced to the right or to the left depending on whether the chamber 8 located on one side of the piston 7 or the chamber 9 located on the other side of the piston 7 exhibits a higher pressure of the fluid medium, generally hydraulic oil.

In order to achieve the particular desired motions of the piston 7, the chambers 8 and 9 can be connected via fluid lines 10 and 11 to the pressure side of a pump 12, it being possible to control or change the pressures in the chambers 8 and 9 by means of a control valve unit 13. The control valve unit 13 is in turn controlled by means of a mechanism 14 which is connected between two parts 2' and 2" of the steering shaft 2. The two steering shaft parts 2' and 2" can rotate relative to one another to a limited extent under the influence of the setting force to be transmitted by the steering shaft 2. This relative rotation of the steering shaft 2 is converted by means of the mechanism 14 into a setting or pivoting movement of a setting element 15, which is a lever of the type shown. The setting element 15 therefore moves to the right or to the left as shown by the arrow P as a function of the rotational direction of the steering shaft 2, the setting movement of the setting element 15 depending on the dimension of the relative rotation between the steering shaft parts 2' and 2".

The setting element 15 then directly controls a control slide 16 of the control valve unit 13.

The control slide 16 is located, as a piston-type part, so as to be displaceable in a bore 17 of the casing of the control valve unit 13. Recesses 19 and 20 and 22 to 24 respectively are located on the control slide 16 and the bore 17 in such a way that the first-mentioned recesses 19 and 20 in the slide 16 are wider in the axial direction of the control slide 16 than the lands remaining between the recesses 22 to 24 of the bore 17.

Control edges 26 to 29 are located on the recesses 19 and 20 and these interact with control edges 32 to 35 on the recesses 22 to 24 in the manner described further below.

The fluid lines 10 and 11 already mentioned branch off from the chambers formed by the recesses 19 and 20. The chamber formed by the recess 23 is connected to the pressure line 37 of the pump 12, whose suction lined 38 leads to a reservoir 39 for the fluid medium. The chambers formed by the recesses 22 and 24 are also connected to the reservoir 39 via lines 40 and 41.

In the central position of the control slide 16 (shown), the fluid fed via the pressure line 37 into the recess 23 flows, at both ends of the recess 23, between the control edges 27, 33 and 28, 34 into the recesses 19 and 20. From these recesses, the fluid enters the fluid lines 10 and 11 and therefore the chambers 8 and 9 of the piston/cylinder unit 6, and also passes between the control edges 26, 32 and 29, 35 into the recesses 22 and 26. From recesses 22 and 26, the fluid flows back through the lines 40 and 41 into the reservoir 39.

In the central position of the control slide (shown), there is the same pressure in the chambers 8 and 9 because the chambers formed by the recesses 19 and 20 also carry equal pressures due to the cross-sections remaining between the control edges 28, 34 and 29, 35 having the same size as the free cross-sections between the control edges 27, 33 and 26, 32. If, then, the setting element 15 displaces the control slide 16, for example to the left, the free gaps between the control edges 27, 33 and 29, 35 are reduced whereas the gaps between the control edges 26, 32 and 28, 34 are increased. In consequence, different pressures appear in the chambers formed by the recesses 19 and 20, there being a low pressure in the region of the recess 19 and a high pressure in the region of the recess 20 because the supply of fluid medium to the recess 19 is throttled and the throttling is simultaneously reduced on the drain of fluid medium from the recess 19 whereas, in the case of the recess 20, the throttling of the supply of fluid medium is reduced and the drain from this recess is throttled. In the extreme case, the supply to the recess 19 between the control edges 27 and 33 is completely shut off whereas, in the case of the recess 20, the supply is completely open and the drain between the control edges 29 and 35 is completely closed.

The different pressures in the chambers formed by the recesses 19 and 20 also appear, via the fluid lines 10 and 11, in the chambers 8 and 9 of the piston/cylinder unit 6 so that when the control slide 16 is displaced to the left, the piston 7 is also displaced to the left, the setting forced generated depending on the dimension of the displacement of the control slide 16.

If the control slide 16 is displaced to the right, there is a pressure drop in the reverse direction in the chambers 8 and 9 of the piston/cylinder unit 6 so that the piston 7 attempts to slide to the right with a setting force which again depends on the dimension of the displacement of the control slide 16.

Since the dimension of the displacement of the control slide depends on the setting movement of the setting element 15 and the latter setting movement depends in turn on the dimension of the relative rotation between the steering shaft parts 2' and 2", which again depends in its turn on the torque to be transmitted by the steering shaft 2, the control slide 16 is displaced to a greater degree, in a direction corresponding to the direction the steering wheel is turned, when the resistance provided by the steered wheels 5 to an actuation of the steering wheel 1 is greater. The setting forces generated by the servo-motor 6 which support the actuation of the steering effected in each case by means of the steering wheel 1 increase correspondingly.

The way in which the setting forces generated by the servo-motor 6 are dependent on or proportional to the torque transmitted by the steering shaft 2 can be altered by additional design measures.

For example, it is possible to arrange axial pocket bores 42 and 43 on the ends of the control slide 16, these pocket bores being connected via ducts 44 and 45 in the control slide 16 to the chambers formed by the recesses 19 and 20, to which the fluid lines 10 and 11 are connected. Pistons 46 and 47 are arranged so that they can be displaced in the pocket bores 42 and 43, the displacement distance being limited by annular stops 48. The pistons 46 and 47 are loaded by means of compressive springs 49 whose ends remote from the piston are supported on fixed parts of the casing of the control valve unit 13.

Because of the arrangement shown, there is a markedly linear relationship between the torques transmitted by the steering shaft 2 and the setting forces generated by the servo-motor 6 because these setting forces are directly fed back to the steering shaft 2.

Figure 2:
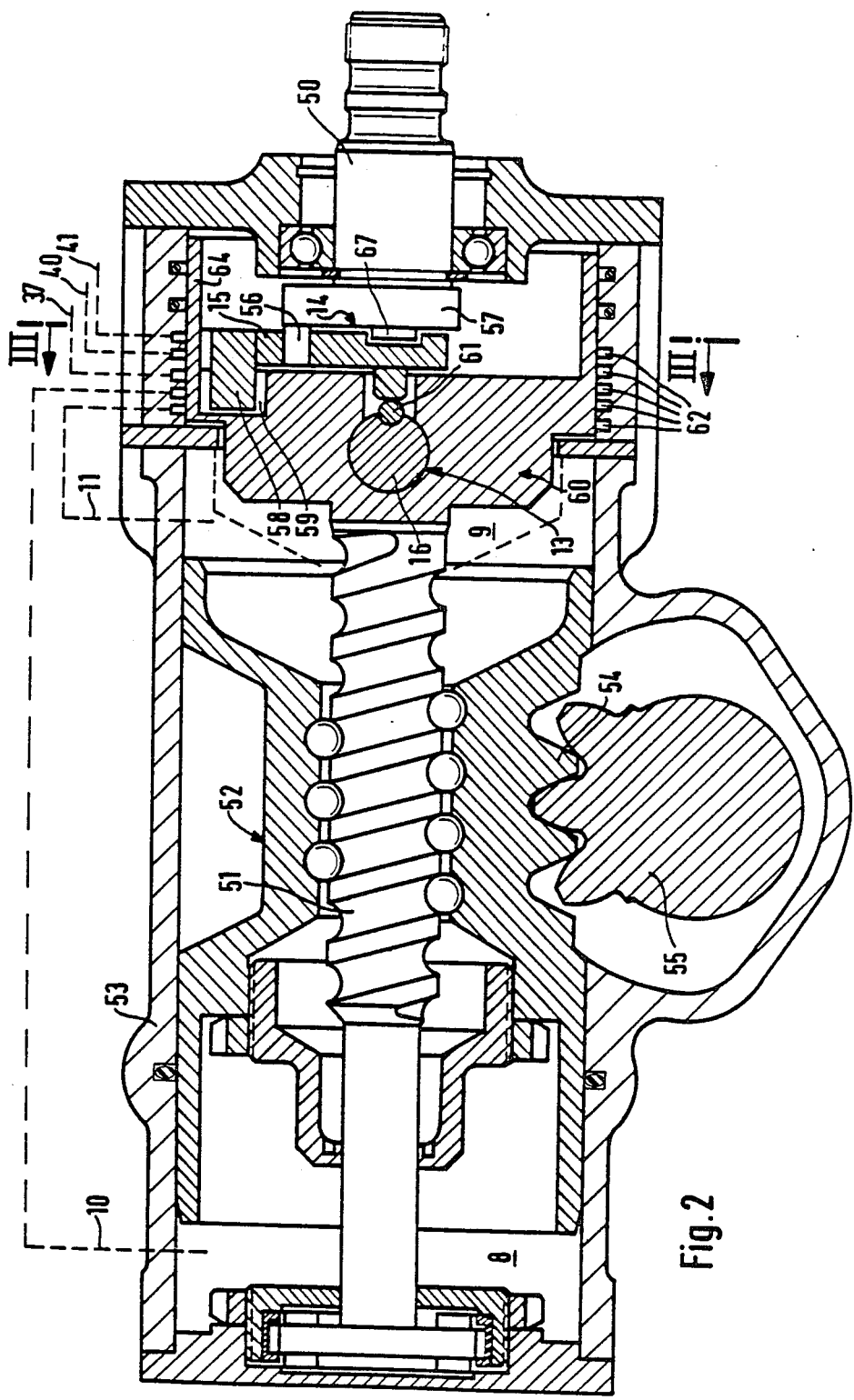
FIG. 2 shows a sectional diagram of the same, the section plane corresponding to an axial plane through the shaft parts.

In the steering gear of the embodiment shown in FIG. 2, an input shaft 50 is rotationally solidly connected to the steering shaft. A worm spindle 51 is located on the same axis as the input shaft 50 and this worm shaft 51 is connected to the input shaft 50 via the mechanism 14. It follows that the input shaft 50 and the spindle 51 functionally correspond to the parts 2' and 2" in FIG. 1.

When the spindle 51 is rotated, a piston 52 slides on it, which piston 52 is guided so that it can be displaced in the casing 53 of the steering gear and meshes by means of side teeth 54 with a toothed segment 55 which, in turn, drives a linkage (not shown) for controlling the steered wheels of the vehicle.

Within the casing 53, the piston 52 separates two chambers 8 and 9 located at its ends, which chambers are filled with hydraulic medium and can be subjected to different pressures in such a way that displacement of the piston 52 is hydraulically supported whenever the worm spindle 52 is put into rotation by the input shaft 50 turning. In conjunction with the casing 53, therefore, the piston 52 forms a unit corresponding to the servo-motor 6 of FIG. 1. The lines 10 and 11 supplying the chambers 8 and 9 in FIG. 2 with a hydraulic medium are only indicated diagrammatically in FIG. 2.

In the embodiment of the invention shown in FIGS. 2 and 4, the mechanism 14 is substantially formed by the setting lever 15, which is designed as a double arm lever and is rotationally supported eccentric to the axis of the input shaft 50 on a support pin 56 parallel to the input shaft 50. The support pin 56 is in turn located on an eccentric part 57 rotationally solidly connected to the input shaft 50. The arm of the lever 15 more remote from the input shaft 50 protrudes by means of a journal 58 into an elongated hole type recess 59 which is located radially with respect to the axial direction of the worm spindle 51 on a casing part 60 for the control valve unit 13, which part 60 is rotationally solidly connected to the worm spindle 51. The elongated hole type recess 59 has a dimension in the radial direction relative to the axis of the worm spindle 51 which is larger than the diameter of the circular cylindrical journal 58, whereas the dimensions of the recess 59 normal to the plane of the drawing in FIG. 2 correspond approximately to the diameter of the journal 58.

Approximately in the region of the axes of the input shaft 50 and the spindle 51 there is, on the other arm of the setting lever 15, a journal with a spherical head 61 which engages in a corresponding recess of the piston-type control slide 16 of the control valve unit 13 in such a way that a pivoting movement of the setting lever 15 relative to the casing part 60 causes a displacement of the control slide 16 within the casing part 60. The control slide 16 is designed and located in the same way, in principle, as that shown in FIG. 1, i.e. the recesses and control edges visible in FIG. 1 are provided on both the control slide 16 and on the bore receiving it in the casing part 60. Furthermore, the lines visible in FIG. 1 are provided as casing holes, not shown in FIG. 2, in the casing part 60 and these lines are provided with openings located on the peripheral surface of the casing part 60, which openings are designed with annular grooves 62 in the wall of the casing 53 surrounding the peripheral wall of the circular cross-section casing part 60 and are connected to the lines 10 and 11 or to the pressure line 37 and the lines 40 and 41 leading to the reservoir 39 (see FIG. 1), as is also shown diagrammatically in FIG. 2.

In order to force the setting lever 15 and the control slide 16 into a central position in the embodiment of the invention shown in FIGS. 2 to 4, a C-type spring clip 63 is provided, whose central region is fed around the end of the setting lever 15 carrying the journal 58 in the gap between the end of the lever and a collar-shaped edge 64 of the casing part 60 and whose clip ends are in contact with the side flanks of the arm of the setting lever 15 carrying the journal with the spherical head 61. At the same time, the ends of the spring clip are in contact with steps 65 which are designed as part of the casing part 60 and extend in the region of the clip ends of the spring clip 63 on approximately the same contours as the edges of the setting lever 15 when located in the central position. If the setting lever 15 is deflected from the central position, the spring clip 63 is spread out because one flank of the setting lever 15 forces one clip end outwards while the other clip end is held fast by one of the steps 65.

In addition, the pivoting range of the setting lever 15 if further limited in that an axial extension 67 on the input shaft 50 or the eccentric part 57 protrudes with clearance into a corresponding recess on the side of the setting lever 15 facing towards the eccentric part 57. It follows that the extension 67 limits the pivoting movement of the setting lever relative to its support pin 56.

The arrangement described functions in the following manner:

If the input shaft 50 is rotated by a corresponding actuation of the steering wheel, this rotation is transmitted to the worm spindle 51 by means of the mechanism 14. Because of the resistance to a rotation of the worm spindle 51 set up particularly by the piston 52 and the toothed segment 55 connected to it, the setting lever 15 is deflected to a greater or lesser extent against the force of the C-type spring clip 63 out of the central position shown in FIG. 3 because a relative rotation—even if relatively slight—occurs between the input shaft 50 and the worm spindle 51. Because of the arrangement of the setting lever 15 shown, the very small relative rotation between the input shaft 50 and the worm spindle 51 is converted into a comparatively large displacement distance of the control slide 16. The large transmission ratio is due, in particular, to the fact that the journals 56 and 58 are located relatively near to one another but relatively far from the axis of the input shaft 50 and the worm spindle 51 and that the arm of the setting lever 15 carrying the spherical head of 61 has a large length compared with the arm carrying the journal 58.

The chambers 8 and 9 in the casing 53 are subjected to different pressures, corresponding to the displacement distance of the control slide 16, so that the piston 52 is also subjected to a hydraulic setting force in a displacement direction corresponding to the particular direction of rotation of the worm spindle.

Because of the limited pivoting capability of the setting lever 15, which is effected by means of the extension 67, the relative rotation between the worm spindle 51 and the input shaft 50 cannot exceed a dimension specified by the design.

In the embodiment shown in FIGS. 2 to 4, the control slide 16 is arranged in such a way that its longitudinal axis intersects the axis of the worm spindle 51. This arrangement is advantageous because, by means of it, the bore in the casing part 60 accepting the control slide 16 can have a length approximately equal to the casing diameter. According to another embodiment of the invention, it is also contemplated to have an arrangement in which the control slide 16 in FIG. 2 is offset downwards so that the longitudinal axis of the control slide 16 extends at a radial distance from the axis of the worm spindle 51 on the side of the spindle opposite to the elongated hole type recess 59.

In this latter embodiment, it is possible, if required, to replace the C-type spring clip 63 for the purpose of providing an elastic drive coupling between the input shaft 50 and the worm spindle 51 by a torsion spring element or the like between the input shaft 50 and the worm spindle 51 or the casing part 60 approximately on the same axis as the input shaft 50 or the spindle 51. For the purpose of leading through the torsion spring element, the setting lever 15 then has a sufficiently large recess in the region of the axis of the input shaft 50 and the worm spindle 51, this recess surrounding the torsion spring element at a distance such that the setting lever 15 can execute a sufficiently large pivoting motion.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Servo-control, in particular power steering for motor vehicles, having an input end shaft part means connected to a steering wheel and a mechanism connecting this shaft part means to an output end shaft part means connected to a steering gear, which mechanism operates with a relatively large transmission ratio and is used to adjust a control slide of a servo-valve unit, which control slide is deflected from a central position, in the case of rotational movements of the shaft parts, by means of the mechanism as a function of the magnitude of the rotational movement of the shaft parts and as a function of the direction of rotation in one direction or the other of the shaft parts, and by this means connects a servo-motor, controlled by the servo-valve unit and drive-connected to the control of steering gear, to a pressure source so as to produce a forward or rearward motion with a setting force which depends on the magnitude of the displacement of the control slide, wherein the mechanism is located directly between the input end shaft part means and the output end shaft part means, elastically connected on the same axis as the input end shaft part means, and the servo-valve unit is located on the output end shaft part means, such that, as the mechanism, a setting lever directly actuating the control slide, is rotationally supported on the input end shaft part means by means of a support pin located parallel and eccentric to the shaft axis and is hinge-connected or coupled to the output end shaft part means on the support pin side of the shaft axis and at a radial distance from the support pin.

2. Servo-control according to claim 1, wherein the setting lever is a double arm lever with support pin parallel and eccentric to the shaft axis, and wherein the double arm lever is rotationally supported on the input end shaft part means and is hinge-connected by one lever arm to the control slide and by the other lever arm to the output end shaft part means.

3. Servo-control according to claim 2, wherein the arm actuating the control slide is longer than the other arm.

4. Servo-control according to claim 3, wherein the mechanism part including the setting lever actuating the control slide is arranged to have limited movement or limited pivoting range.

5. Servo-control according to claim 4, wherein the setting lever encompasses with play a protrusion on the input end shaft part means by means of a recess outside its support pin.

6. Servo-control according to claim 5, wherein the setting lever is restrained in the central position by means of a C-shaped spring clip, the spring clip encompassing the setting lever or one of its lever arms and the abutments of the spring clip being located on the output end shaft part means at a distance apart equal to the width of the setting lever or of the lever arm in the region of the ends of the spring clip.

7. Servo-control according to claim 6, wherein the control slide is a piston-type part, said piston-type part being located so as to be displaceable in a radial plane of the output end shaft part means.

8. Servo-control according to claim 7, wherein the axis of the control slide intersects the shaft axis at right angles.

9. A mechanism for use with a power steering arrangement for a motor vehicle of the type having an input shaft part means connected to a steering wheel and an output shaft part means connected to a steering gear and having a control valve responsive to relative movements between the input shaft part means and the output shaft part means for controlling pressure to a servo-motor which is drivingly connected to the steering gear, comprising:
 a lever arranged between the input shaft part means and the output shaft part means, said lever being rotationally supported on the input shaft part means along an axis which is parallel and eccentric to a central axis of the input shaft part means, the lever being operatively connected to the control valve, said lever transmitting to the control valve movements based on relative movements between the input shaft part means and the output shaft part means,
 wherein the lever is a two arm lever, one arm operatively connected to the output shaft part means and the other arm being operatively connected to the control valve.

10. A mechanism according to claim 9, wherein the control valve is arranged on the output shaft part means.

11. A mechanism according to claim 10, wherein the control valve includes a control slide arranged for movement within a valve bore, wherein the lever directly actuates the control slide to control the pressure to the servo-motor.

12. A mechanism according to claim 11, wherein the control slide is arranged as a piston-type part within a bore of the control valve, said control slide arranged to be displaceable in a radial plane of the output shaft part or an extension thereof.

13. A mechanism according to claim 12, wherein an axis of the control slide intersects the axes of the shafts at right angles.

14. A mechanism according to claim 9, wherein the arms of the lever include axial extensions which are operatively connected with the output shaft part means and the control valve, said extension on the one arm being arranged at a closer radial distance to the axis about which the lever rotates than the extension on the other arm.

15. A mechanism according to claim 14, wherein the axis about which the lever is rotationally supported and the extension on the one arm are arranged at a further radial distance from the central axis of the input shaft part means than the extension on the other arm is arranged from the central axis of the input shaft part means.

16. A mechanism according to claim 15, wherein the arm actuating the control valve is longer than the other arm.

17. A mechanism according to claim 9, wherein the lever is arranged to have limited rotational movement.

18. A mechanism according to claim 9, wherein the lever has a recess which receives with play a protrusion of the input shaft part means, said recess being arranged at a radial distance from the support pin.

19. A mechanism for use with a power steering arrangement for a motor vehicle of the type having an input shaft part means connected to a steering wheel and an output shaft part means connected to a steering gear and having a control valve responsive to relative movements between the input shaft part means and the output shaft part means for controlling pressure to a servo-motor which is drivingly connected to the steering gear, comprising:
 a lever arranged between the input shaft part means and the output shaft part means, said lever being rotationally supported on the input shaft part means along an axis which is parallel and eccentric to a central axis of the input shaft part means, the lever being operatively connected to the control valve, said lever transmitting to the control valve movements based on relative movements between the input shaft part means and the output shaft part means,
 wherein the lever is rotationally supported on the input shaft part means by a support pin arranged parallel and eccentric to the central axis of the input shaft part means.

20. A mechanism for use with a power steering arrangement for a motor vehicle of the type having an input shaft part means connected to a steering wheel and an output shaft part means connected to a steering gear and having a control valve responsive to relative movements between the input shaft part means and the output shaft part means for controlling pressure to a servo-motor which is drivingly connected to the steering gear, comprising:
- a lever arranged between the input shaft part means and the output shaft part means, said lever being rotationally supported on the input shaft part means along an axis which is parallel and eccentric to a central axis of the input shaft part means, the lever being operatively connected to the control valve, said lever transmitting to the control valve movements based on relative movements between the input shaft part means and the output shaft part means,
- wherein the lever is biased in a central position by a C-shaped spring clip having abutments on each end, said spring clip surrounding the lever or one of the lever arms and said abutments being arranged on the output shaft part means at a distance apart equal to one of the width of the lever or the width of the lever arm in the region of the ends of the spring clip.

21. A power steering arrangement for driving wheels of a motor vehicle, comprising:
- a steering wheel,
- an input shaft part means for transmitting the motion of the steering wheel to an output shaft part means, said output shaft part means being configured for driving a steering gear arrangement which drives the wheels,
- a mechanism for receiving relative movements of the shaft parts, said mechanism being arranged between the input and output shaft part means,
- a control valve for controlling pressure to a servo-motor, said servo-motor being drivingly connected to the steering gear arrangement,
- wherein the mechanism transmits the relative movements of the input and output shaft part means to the control valve, and wherein the mechanism includes a lever which is rotationally supported on the input shaft part means along an axis which is parallel and eccentric to a central axis of the input shaft part means, the lever being operatively connected to the output shaft part means and being operatively connected to the control valve,
- wherein the lever is a two arm lever, one arm being operatively connected to the output shaft part means and the other arm being operatively connected to the control valve.

22. A mechanism according to claim 21, wherein the control valve is arranged on the output shaft part means.

23. A mechanism according to claim 22, wherein the control valve includes a control slide arranged for movement within a valve bore, wherein the lever directly actuates the control slide to control the pressure to the servo-motor.

24. A mechanism according to claim 23, wherein the control slide is arranged as a piston-type part within a bore of the control valve, said control slide arranged to be displaceable in a radial plane of the output shaft part means.

25. A mechanism according to claim 24, wherein an axis of the control slide intersects the axes of the input and output shaft part means at right angles.

26. A mechanism according to claim 21, wherein the arms of the lever include axial extensions which are operatively connected with the output shaft part means and the control valve, said extension on the one arm being arranged at a closer radial distance from the axis about which the lever rotates than the extension on the other arm.

27. A mechanism according to claim 26, wherein the axis about which the lever is rotationally supported and the extension on the one arm are arranged at a further radial distance from the central axis of the input shaft part means than the extension on the other arm.

28. A mechanism according to claim 27, wherein the arm actuating the control valve is longer than the other arm.

29. A mechanism according to claim 21, wherein the lever is arranged to have limited rotational movement.

30. A mechanism according to claim 21, wherein the lever has a recess which receives with play a protrusion of the input shaft part means, said recess being arranged at a radial distance from the support pin.

31. A power steering arrangement for driving wheels of a motor vehicle, comprising:
- a steering wheel,
- an input shaft part means for transmitting the motion of the steering wheel to an output shaft part means, said output shaft part means being configured for driving a steering gear arrangement which drives the wheels,
- a mechanism for receiving relative movements of the shaft parts, said mechanism being arranged between the input and output shaft part means,
- a control valve for controlling pressure to a servo-motor, said servo-motor being drivingly connected to the steering gear arrangement,
- wherein the mechanism transmits the relative movements of the input and output shaft part means to the control valve, and wherein the mechanism includes a lever which is rotationally supported on the input shaft part means along an axis which is parallel and eccentric to a central axis of the input shaft part means, the lever being operatively connected to the output shaft part means and being operatively connected to the control valve,
- wherein the lever is rotationally supported on the input shaft part means by a support pin arranged parallel and eccentric to the central axis of the input shaft part means.

32. A power steering arrangement for driving wheels of a motor vehicle, comprising:
- a steering wheel,
- an input shaft part means for transmitting the motion of the steering wheel to an output shaft part means, said output shaft part means being configured for driving a steering gear arrangement which drives the wheels,
- a mechanism for receiving relative movements of the shafts parts, said mechanism being arranged between the input and output shaft part means,
- a control valve for controlling pressure to a servo-motor, said servo-motor being drivingly connected to the steering gear arrangement,
- wherein the mechanism transmits the relative movements of the input and output shaft part means to the control valve, and wherein the mechanism includes a lever which is rotationally supported on the input shaft part means along an axis which is parallel and eccentric to a central axis of the input shaft part means, the lever being operatively connected to the output shaft part means and being operatively connected to the control valve, wherein the lever is biased in a central position by a C-shaped spring clip having abutments on each end, said spring clip surrounding one of the lever or one of the lever arms and said abutments being arranged on the output shaft part means at a distance apart equal to one of the width of the lever or the width of the lever arm in the region of the ends of the spring clip.

* * * * *